US006252885B1

(12) United States Patent
Yashiro et al.

(10) Patent No.: US 6,252,885 B1
(45) Date of Patent: *Jun. 26, 2001

(54) CATV COMMUNICATION SYSTEM, METHOD OF COMMUNICATION BY THE SAME, AND CENTER AND TERMINAL DEVICES THEREOF

(75) Inventors: Kenji Yashiro; Tetsuichiro Sasada, both of Tokyo-to (JP)

(73) Assignees: Pioneer Electronic Corporation; Image A Corporation, both of Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/301,554

(22) Filed: Apr. 29, 1999

Related U.S. Application Data

(62) Division of application No. 08/756,522, filed on Nov. 26, 1996, now Pat. No. 5,930,475.

(30) Foreign Application Priority Data

Nov. 28, 1995 (JP) .......... 7-309345

(51) Int. Cl.[7] .......... H04B 7/212; H04L 12/413; H04L 12/43

(52) U.S. Cl. .......... 370/443; 370/447; 370/457

(58) Field of Search .......... 370/442, 443, 370/444, 445, 447, 458, 459, 461, 462

(56) References Cited

U.S. PATENT DOCUMENTS

| | | | | |
|---|---|---|---|---|
| 5,142,532 | | 8/1992 | Adams | 370/432 |
| 5,355,374 | | 10/1994 | Hester et al. | 370/461 |
| 5,471,474 | | 11/1995 | Grobicki et al. | 370/437 |
| 5,696,765 | | 12/1997 | Safadi | 370/436 |
| 5,802,061 | * | 9/1998 | Agarwal | 370/461 |
| 5,805,203 | * | 9/1998 | Horton | 370/458 |
| 5,930,475 | * | 7/1999 | Yashiro et al. | 709/217 |
| 5,956,325 | * | 9/1999 | Citta et al. | 370/252 |
| 5,966,163 | * | 10/1999 | Lin et al. | 370/439 |

* cited by examiner

*Primary Examiner*—Huy D. Vu
*Assistant Examiner*—Kevin C. Harper
(74) *Attorney, Agent, or Firm*—Young & Thompson

(57) ABSTRACT

The CATV system includes a center device and a plurality of terminal devices. The center device sends downstream timeslots, to the terminal devices, including upstream timeslots occupancy information and collision information. Upstream timeslot occupancy information indicates whether or not an upstream timeslot corresponding to the downstream timeslot is vacant, and collision information indicates whether or not a collision has occurred. The terminal device receives the downstream timeslot, checks upstream timeslot occupancy information to detect upstream timeslot in the vacant state, and sends upstream data to the center device via the vacant upstream timeslot. If the upstream timeslot makes a collision, the center device detects it and sends a downstream timeslot which includes collision information indicative of the occurrence of the collision. The user of the terminal device recognizes the collision having occurred or not by referring to the collision information.

16 Claims, 8 Drawing Sheets

CATV COMMUNICATION SYSTEM, METHOD OF COMMUNICATION BY THE SAME, AND CENTER AND TERMINAL DEVICES THEREOF

CROSS-REFERENCE TO RELATED APPLICATIONS

This application is a division of application Ser. No. 08/756,522, filed Nov. 26, 1996 now U.S. Pat. No. 5,930,475.

BACKGROUND OF THE INVENTION

1. Field of the Invention

The present invention relates to data communication by a CATV communication system, and more particularly to a CATV communication system including a center device and terminal devices, and a method of performing data communication by means of the CATV communication system.

2. Description of the Prior Art

There are conceivable some methods of the data communication by using a duplex or bi-directional CATV communication system. One of them is the packet communication method with collision detection function, which is generally employed in a LAN or the like. Now, it is assumed that a user A sends data to another user B via the CATV wired line. According to this method, the user A sends data via the upstream transmission line to the center device, which returns data thus received to send it to all the terminal devices, including the terminal device of the user B, via the downstream transmission line. If no collision takes place, the user A, the sender, refers to data returned via the downstream transmission line and determines the coincidence of returned data with data that he has sent, thereby confirming the correct data transmission being executed. On the other hand, if plural users send data, respectively, almost simultaneously, data collision likely takes place. FIG. 7 schematically illustrates the manner of the data collision, wherein the user A sent data Da via the upstream transmission line, but the user B also sent data Db almost at the same time. Data Da and data Db collide with each other to be broken, and consequently data Dx different from original data Da and Db is generated. Data Dx is received by the center device, which returns it to the downstream transmission line. The users A and B detect discordance between data that they have sent, respectively, and data returned, and recognize the collision has taken place.

An alternative way for the data communication via the CATV communication system is to use the timeslot system which is generally illustrated in FIG. 8. This system divides the upstream transmission line and the downstream transmission line into a plurality of unit time (generally called "timeslot") each having a predetermined time width, and a timeslot is assigned to a user. For example, assuming now that the eighth timeslot (oblique portion in FIG. 8) is assigned to the user A, he uses the eighth timeslot thus assigned for the data communication thereafter. Large capacity data may be transmitted by repeatedly sending the divided portions of data at the successive cycles of the eighth timeslot each having a limited data capacity.

However, the packet communication method with collision detection function described above has the following drawbacks. First, the collision occurrence is not found until broken data is received in the downstream transmission line by the sender, and hence the collision detection generally delays. Second, the users send data of random data length, respectively, and hence, when a user sends a large data, other users have to wait for a long time until his data transmission ends. Third, since downstream data cannot be transmitted while the upstream data is returned by the center device for the purpose of the collision detection, a complete duplex communication cannot be achieved.

On the other hand, the timeslot communication system has the following disadvantages. First, since the limited number of timeslots are assigned to the users for the exclusive use, only a limited number of users can make the data transmission simultaneously. Second, generally, the user does not actually send or receive data for a continuous long time period. Even when two users are communicating with each other by sending and receiving data, data is not actually running through the transmission line for a long time period, and the users are not sending or receiving data but referring to the received data or preparing the response in the major time period. But even in such a period in which data is not actually running through the transmission line, the transmission line is still kept connected, and hence the transmission line is not very efficiently used.

SUMMARY OF THE INVENTION

It is an object of the present invention to provide a method of data communication by using a CATV communication system, by which efficient data transmission can be achieved.

It is another object of the present invention to provide a CATV communication system by which data communication can be efficiently achieved.

It is still another object of the present invention to provide a center device and terminal devices employed in the CATV communication system.

According to one aspect of the present invention, there is provided a communication method for a CATV communication system which includes a center device and a plurality of terminal devices connected by CATV wired lines, the method including the steps of: (a) transmitting, from the center device to the terminal devices, cyclically a group of downstream timeslots each of which is distinctive from each other, each of the downstream timeslots including upstream timeslot occupancy information indicating whether or not an upstream timeslot corresponding to the downstream timeslot is vacant, collision information indicating whether or not a collision has occurred, and downstream data; (b) checking, at the terminal device, the upstream timeslot occupancy information in the downstream timeslots to detect a downstream timeslot including the upstream timeslot occupancy information of the vacant state; (c) sending upstream data, from the terminal device to the center device, by the upstream timeslot specified by the upstream occupancy information of the vacant state at a timing corresponding to the downstream timeslot detected in the step (b); (d) receiving, at the center device, the upstream timeslot sent in the step (c), detecting a collision of the upstream timeslot, and sending a downstream timeslot, in response to the upstream timeslot sent in the step (c), which includes the collision information set in accordance with the result of the collision detection; (e) detecting, at the terminal device, the collision information of the downstream timeslot sent in the step (d), and sending to the center device upstream data by the upstream timeslot corresponding to the downstream timeslot sent in the step (d), if the collision is not detected; and (f) detecting, at the center device, a carrier signal to be modulated by the upstream data in the upstream timeslots, and setting the upstream timeslot occupancy information of the downstream timeslot, corresponding to the upstream timeslot which includes no carrier signal, to the vacant state.

In accordance with the method, a group of downstream timeslots are transmitted from the center device to the terminal devices. Each downstream timeslot includes upstream timeslot occupancy information and collision information as well as downstream data. Then, the upstream timeslot occupancy information is checked at the terminal device to detect a downstream timeslot including the upstream timeslot occupancy information of the vacant state. Then, upstream data is sent from the terminal device to the center device via the upstream timeslot of the vacant state thus detected. Then, the center device receives the upstream timeslot thus sent and detects the collision to send the collision information of the timeslot to the terminal device. The terminal device checks the collision information thus sent, and continues transmission of the upstream data by the upstream timeslot if no collision is detected.

In this way, the center device detects the collision and informs the terminal devices of the collision occurred by means of the collision information, and hence the portion of the downstream timeslot other than the collision information can be used for the downstream data transmission, even if the collision occurred, thereby the data transmission loss resulted by the collision is diminished. Namely, since data capacity of merely the single upstream timeslot collided is lost due to the collision, data loss can be reduced.

The method may further include the step of repeating the steps (b) to (e) until the upstream timeslot occupancy information of the vacant state is no longer detected. By this, data transmission efficiency can be further improved when the transmission line is uncrowded.

The method may further include the step of repeating the steps (b) to (e) until a predetermined number of vacant upstream timeslots are detected. By this, unfavorable exclusive occupancy of the transmission line only by a few users may be avoided.

The method may further be configured such that the step (d) includes the step of including, in the downstream timeslot, the downstream data addressed to one or more of the terminal devices other than the terminal device which has sent the upstream data in the step (b). By this, the downstream timeslot can be efficiently used even if the collision took place.

The method may further include the step of changing the upstream timeslot occupancy information to the vacant state, if the carrier signal is not detected from an identical upstream timeslot for a predetermined time period in the step (f). By this, another user can use the timeslot during the short break of the data transmission by the user who has used the timeslot.

The method may further include the step of: (g) detecting, at the terminal device, the collision information of the downstream timeslot sent in the step (d), checking the upstream timeslot occupancy information in the downstream timeslots to detect another downstream timeslot including the upstream occupancy information of the vacant state, and repeating the steps (c) to (e), if the collision is detected.

The method may configured such that the step (f) includes the steps of: (h) setting, at the center device, the upstream timeslot occupancy information of a downstream timeslot to the occupied state, if a carrier signal to be modulated by the upstream data is detected and no collision are detected in the upstream timeslot corresponding to the downstream timeslot; and (i) setting, at the center device, the upstream timeslot occupancy information of a downstream timeslot to the vacant state, if a carrier signal to be modulated by the upstream data is not detected at the upstream timeslot corresponding to the downstream timeslot.

According to another aspect of the present invention, there is provided a CATV communication system including a center device and a plurality of terminal devices connected by CATV wired lines. The center device includes a downstream timeslot sending unit for cyclically sending a group of downstream timeslots to the terminal devices, each of the downstream timeslots being distinctive from each other and including upstream timeslot occupancy information indicating whether or not an upstream timeslot corresponding to the downstream timeslot is vacant, collision information indicating whether or not a collision has occurred, and downstream data; a collision information setting unit for detecting the collision of the upstream timeslot and for setting the collision information of the downstream timeslot in accordance with the result of the collision detection; and an occupancy information setting unit for detecting a carrier signal to be modulated by upstream data in the upstream timeslots, and for setting the upstream timeslot occupancy information of the downstream timeslot to the vacant state when the upstream timeslot including no carrier signal is detected. Each of the terminal device includes: a vacant timeslot detecting unit for checking the upstream timeslot occupancy information in the downstream timeslots to detect a vacant upstream timeslot specified by the upstream timeslot occupancy information; a collision information checking unit for checking the collision information in the downstream timeslots to detect the collision; and an upstream timeslot sending unit for sending the upstream data to the center device by the vacant upstream timeslot at a timing corresponding to the downstream timeslot including the upstream timeslot occupancy information of the vacant state, unless the collision information checking unit detects the collision.

In accordance with the system thus configured, the downstream timeslot sending unit sends cyclically a group of downstream timeslots to the terminal devices. Each downstream timeslot includes upstream timeslot occupancy information and collision information as well as downstream data. Then, the vacant timeslot detecting unit checks the upstream timeslot occupancy information to detect a downstream timeslot including the upstream timeslot occupancy information of the vacant state. Then, the upstream timeslot sending unit sends upstream data to the center device via the vacant upstream timeslot detected. Then, at the center device, the collision detecting unit detects the collision of the upstream timeslot thus sent and sends the downstream timeslot including the collision information of the timeslot to the terminal device. The collision information checking unit at the terminal device checks the collision information thus sent, and continues transmission of the upstream data by the upstream timeslot if no collision is detected.

In this way, the center device detects the collision and informs the terminal devices of the collision occurred by means of the collision information, and hence the portion of the downstream timeslot other than the collision information and the upstream occupancy information can be used for the downstream data transmission, even if the collision occurred, thereby the data transmission loss resulted by the collision being diminished. Namely, since data capacity of merely the single upstream timeslot collided is lost due to the collision, data loss can be reduced.

Further, the CATV communication system may be configured such that the downstream timeslot sending unit includes a unit for including, in the downstream timeslot, the downstream data addressed to one or more of the terminal devices other than the terminal device which has sent the upstream data resulted in the collision. By this, the downstream timeslot can be efficiently used even if the collision took place.

Still further, the CATV communication system may be configured such that the downstream timeslot sending unit includes a unit for changing the upstream timeslot occupancy information to the vacant state, if the occupancy information setting unit does not detect the carrier signal from an identical upstream timeslot for a predetermined time period. By this, another user can use the timeslot during the short break of the data transmission by the user who has used the timeslot.

Still further, the CATV communication system may be configured such that the collision information setting unit includes a unit for performing error detection of the upstream data using a CRC code and for determining that the collision takes place if the error is detected through the CRC code calculation. Alternatively, the CATV communication system may be configured such that the collision information setting unit includes a unit for detecting a level of the carrier signal carrying the upstream timeslot, and for determining that the collision takes place if the upstream timeslot carried by the carrier signal cannot be demodulated.

According to still another aspect of the present invention, there is provided a center device of a CATV communication system connected with a plurality of terminal devices via CATV wired lines, the center device including: a downstream timeslot sending unit for cyclically sending a group of downstream timeslots to the terminal devices, each of the downstream timeslot being distinctive from each other and including upstream timeslot occupancy information indicating whether or not an upstream timeslot corresponding to the downstream timeslot is vacant, collision information indicating whether or not a collision has occurred, and downstream data; a collision information setting unit for detecting the collision of the upstream timeslot and for setting the collision information of the downstream timeslot in accordance with the result of the collision detection; and an occupancy information setting unit for detecting a carrier signal to be modulated by upstream data in the upstream timeslots, and for setting the upstream timeslot occupancy information of the downstream timeslot to a vacant state when the upstream timeslot including no carrier signal is detected.

According to still another aspect of the present invention, there is provided a terminal device of a CATV communication system connected, via CATV wired lines, with a center device which cyclically sends a group of downstream timeslots to the terminal device, each of said downstream timeslot being distinctive from each other and including upstream timeslot occupancy information indicating whether or not an upstream timeslot corresponding to the downstream timeslot is vacant, collision information indicating whether or not a collision has occurred, and downstream data, the terminal device including: a vacant timeslot detecting unit for checking the upstream timeslot occupancy information in the downstream timeslots to detect a vacant upstream timeslot specified by the upstream timeslot occupancy information; a collision information checking unit for checking the collision information in the downstream timeslots to detect the collision; and an upstream timeslot sending unit for sending the upstream data to said center device by the vacant upstream timeslot at a timing corresponding to the downstream timeslot including the upstream timeslot occupancy information of the vacant state, unless said collision information checking means detects the collision.

The nature, utility, and further features of this invention will be more clearly apparent from the following detailed description with respect to preferred embodiment of the invention when read in conjunction with the accompanying drawings briefly described below.

DETAILED DESCRIPTION OF THE PREFERRED EMBODIMENTS

The preferred embodiments of the present invention will now be described below with reference to the attached drawings.

Figure 1:
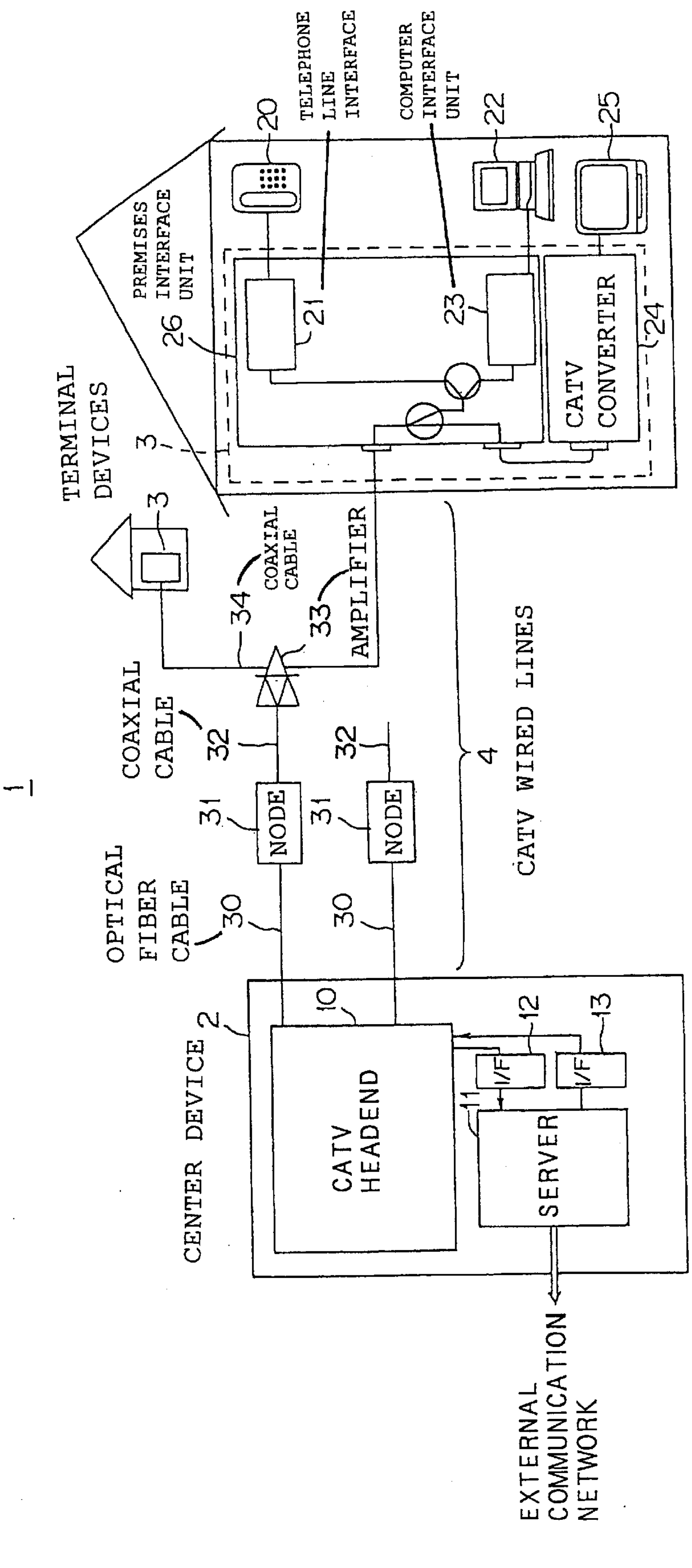
FIG. 1 is a block diagram illustrating the configuration of the CATV communication system according to the present invention.

FIG. 1 illustrates the configuration of the CATV communication system according to the present invention. As shown, the CATV communication system 1 roughly includes the center device 2 for performing the total management and administration of the system 1 and terminal devices 3 provided in subscriber's homes. The center device 2 and the terminal devices 3 are connected by the CATV wired lines 4 to perform data transmission bi-directionally between them.

The center device 2 includes the CATV headend 10, including broadcasting facilities, the interfaces 12 and 13, and the server 11 which performs the interfacing function of data outputted by the CATV headend 10 to connect it with the external communication network. On the other hand, at the terminal device 3, the computer 22 installed in the subscriber's home is connected with the CATV wired line 4 via the home interface device (hereinafter referred to as "PID" (Premises Interface Unit)) 26. The PID 26 includes a computer interface unit 23 which is a unit for the interfacing function. Further, the PID 26 is provided with the telephone line interface 21 to which the telephone 20 is connected for the purpose of voice communication. To the PID 26 is connected the CATV converter 24 which is connectable to the television set 25. The CATV wired line 4 includes the fiber node 31 and the line extender amplifier 33. The fiber node 31 is connected with the center device 2 by means of the optical fiber cables 30 of a predetermined number. The line, extender amplifier 33 is connected with the fiber node 31 via the coaxial cable 32 and is also connected with the terminal devices 3 in the subscriber's homes via the coaxial cable 34.

Figure 5A:
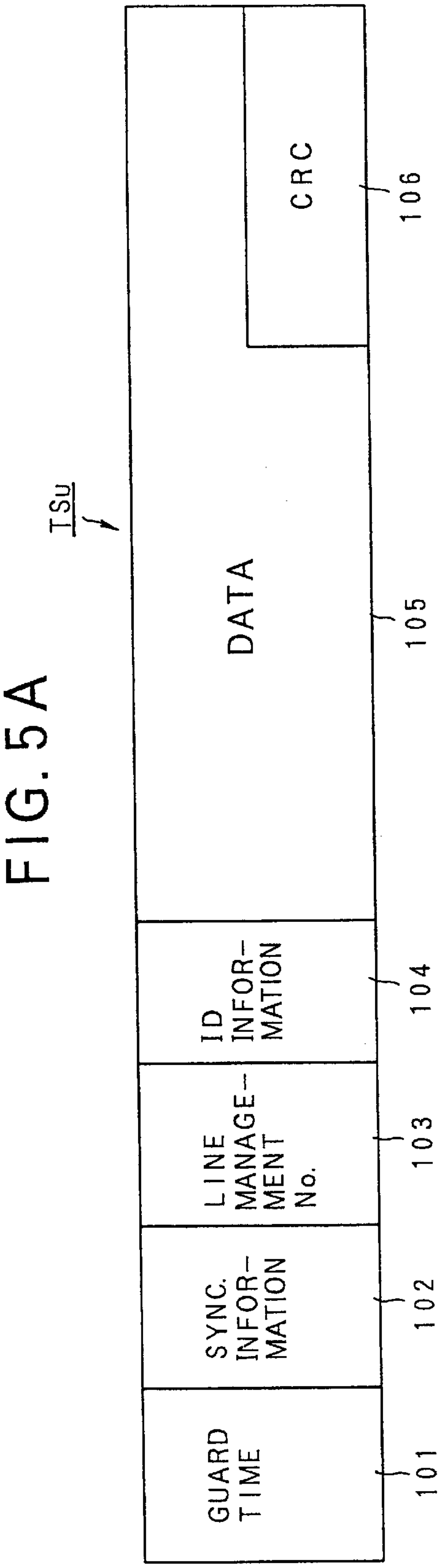
FIGS. 5A and 5B are diagrams illustrating the contents of the upstream time slot and the downstream timeslot, respectively.
Figure 5B:
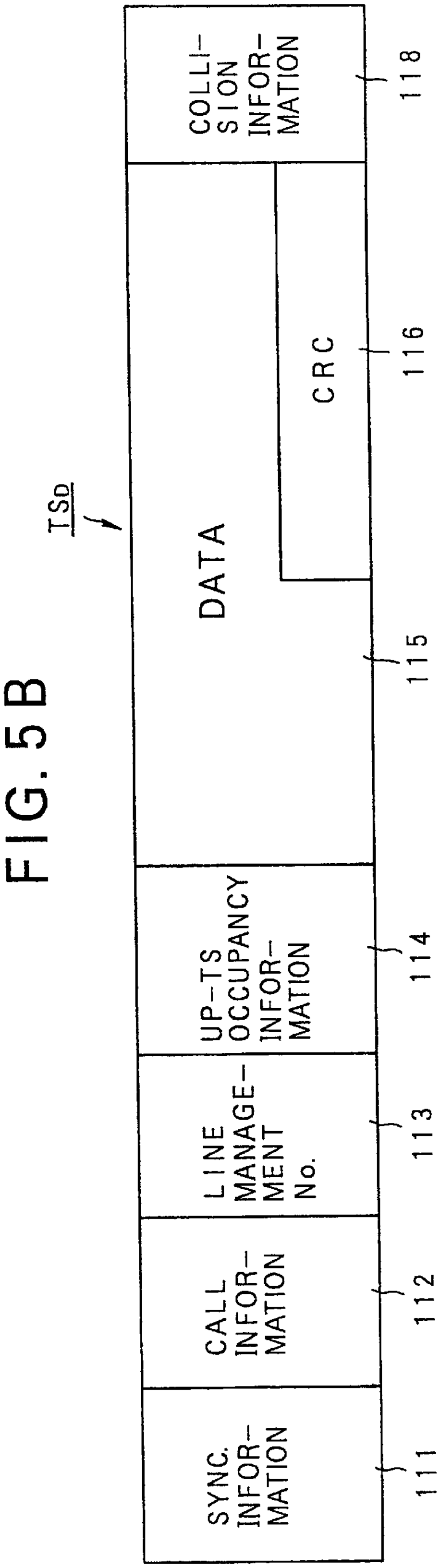

Next, the contents of the timeslot, which constitutes a unit of data communication according to the invention, will be described with reference to FIG. 5A and 5B. FIG. 5A illustrates the contents of the upstream timeslot TSU, and FIG. 5B illustrates the contents of the downstream timeslot TSD. It is noted that a group of the timeslots which is cyclically transmitted is called as frame. The upstream timeslot TSU contains guard time 101, synchronization information 102, line management number 103, ID information 104, data (upstream data) 105 and error detection code, e.g., CRC (Cyclic Redundancy Check) code 106. Guard time is a margin time provided so as to avoid the overlapping of the successive upstream timeslots TSU transmitted from the different terminal devices 3, by absorbing the subtle shifts of the data transmitting timings. Synchronization information 102 defines the border of two successive upstream timeslots TSU, and the line management number 103 identifies the kind of data 105. Identification information 104 is the identification number of the terminal device 3 and is mainly used by the center device 2 to identify the sender terminal device 3 which has sent the upstream timeslot TSU.

On the other hand, the downstream timeslot TSD contains synchronization information 111, call information 112, line management number 113, upstream timeslot occupancy information 114, data (downstream data) 115, error detection code 116 such as CRC code and collision information 118. Synchronization information 111 represents the order of the downstream timeslots TSD successively transmitted by the center device 2, and the terminal devices 3 detect synchronization information 111 to identify the respective downstream timeslots TSD. The line management number 113 identifies the kind of data 115. Upstream timeslot occupancy information 114 represents the terminal device 3 which is occupying, i.e., exclusively using, the timeslot for the data transmission. Namely, the terminal device 3 specified by the upstream timeslot occupancy information 114 is using that timeslot. If the a No. 1 downstream timeslot out of ten timeslots contains upstream timeslot occupancy information 114 specifying a certain terminal device, e.g., terminal device Tx, it means that the No. 1 timeslot is being exclusively used by the terminal device Tx. When receiving an upstream timeslot TSU correctly from a terminal device 3, the center device 2 writes the terminal ID of the terminal device, equal to ID information 104 included in the timeslot, to upstream timeslot occupancy information 114. In the event that the corresponding upstream timeslot TSU is not correctly received due to the collision occurred, or that the center device 2 cannot detect the carrier signal at the receiving timing of the upstream timeslot, the center device 2 sets upstream timeslot occupancy information 114 to zero ("0"), indicating that the corresponding upstream timeslot TSU is vacant. Downstream data 115 may be directed to a terminal different and independent from the terminal which has sent the upstream timeslot TSU. Collision information 118 indicates that there occurred a collision with respect to the upstream timeslot TSU sent from the terminal device 3. Namely, in case that the center device 2 receives the upstream timeslot TSU including broken data or the like found by the error detection, the center device 2 recognizes that there occurred a collision between the upstream timeslots TSU sent from different terminal devices 3 or between the upstream timeslot and a disturbing noise or the like, and includes certain type of data to the collision information 118 indicating the collision being occurred and therefore the timeslot being not correctly received. Contents of data 115 is entirely different and independent from that of the corresponding upstream timeslot TSU. Upstream timeslot occupancy information 114 and collision information 118 is read out by the terminal device 3 which has sent the upstream timeslot TSU corresponding to the downstream timeslot TSD, however, data 115 is read out by the terminal device 3 whose terminal ID is designated by call information 112. It is noted that the arrangement and the order of respective information shown in FIGS. 5A and 5B are simply an example, and they may be naturally altered or modified according to need.

Figure 2:
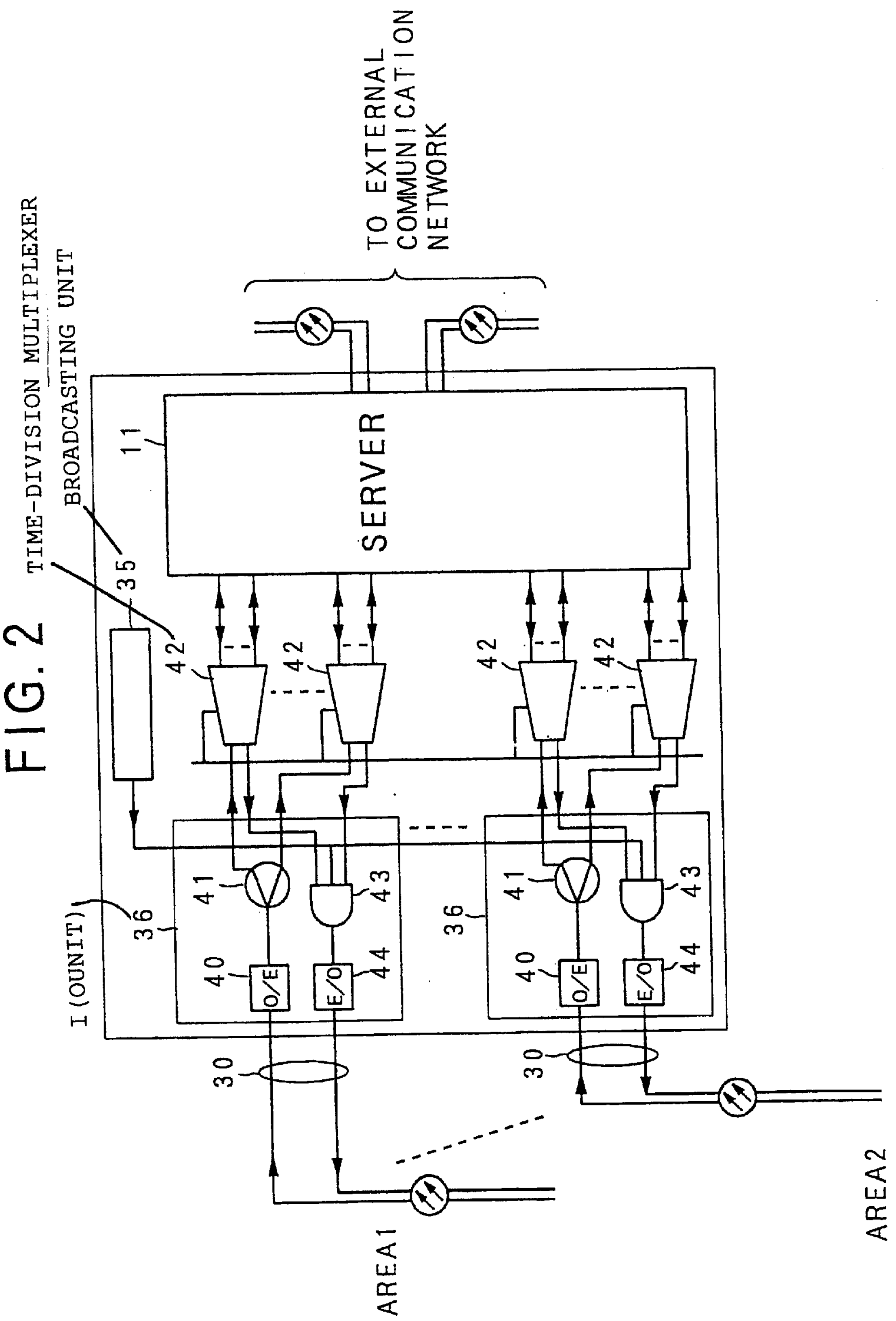
FIG. 2 is a block diagram illustrating the detailed configuration of the center device shown in FIG. 1.

Next, more detailed description will be given of the respective components of the CATV communication system 1. FIG. 2 shows the further detail of the center device 2. The center device 2 includes the broadcasting unit 35, a plurality of I/O interface units 36, a plurality of time-division multiplexers 42 and the server 11. The broadcasting unit 35 outputs various data, including video data, and the I/O interface unit 36 performs the interface function between the optical fiber cable 30 and the server 11. The server 11 connects all the I/O interface units 36 with the external communication network. Further, the server 11 stores necessary data therein and supplies it to the appropriate units in the center device 2. The time-division multiplexer 42 is connected with the fiber cable 30 via the distributor 41 and the optical-electrical converter 40, or the mixer 43 and the electric-optical converter 44. The time-division multiplexer 42 multiplexes data from the server 11 into the timeslots to supply them to the I/O interface units 36, and also demultiplexes data from the optical fiber cable 30 to supply them to the server 11.

Figure 3:
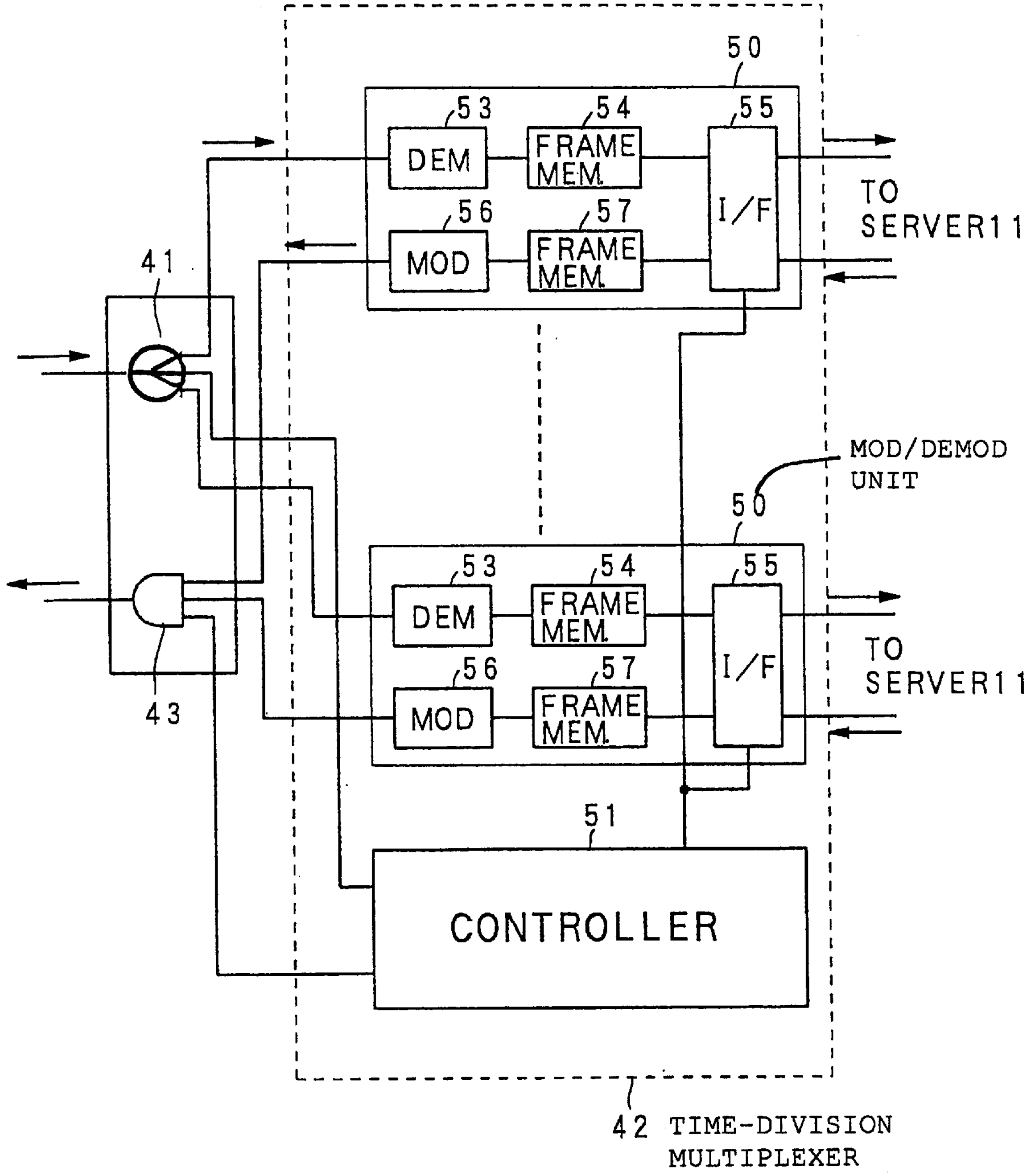
FIG. 3 is a block diagram illustrating the detailed configuration of the time-division multiplexer shown in FIG. 2.

FIG. 3 shows the configuration of the time-division multiplexer 42, which includes a plurality of modulation/demodulation units 50 and the controller 51. The modulation/demodulation unit 50 demodulates and then time-division demultiplexes the signal from the distributor 41 and then supplies the resultant signal to the server 11. In addition, the modulation/demodulation unit 50 multiplexes and modulates the signal from the server 11, and then supplies the resultant signal to the mixer 43. The controller 51 designates the timeslots which the modulation/demodulation unit 50 applies the multiplexing and/or demultiplexing. The modulation/demodulation unit 50 includes the modulator 56 for modulating the signal from the server 11, the demodulator 53 for demodulating the signal received from the terminal devices 3, the frame memories 54 and 57 for temporarily storing the contents of the timeslot, and the interface unit 55. The interface unit 55 chooses and picks up the necessary timeslot from the frame memory 54 in response to the instruction by the controller 51, and then supplies it to the server 11. In addition, the interface unit 55 modifies data from the server 11 into timeslot data, and resultant timeslot data is stored in the frame memory 57. The frame memory 57 reads out timeslot data successively and cyclically, and supplies them to the modulator 56.

Figure 4:
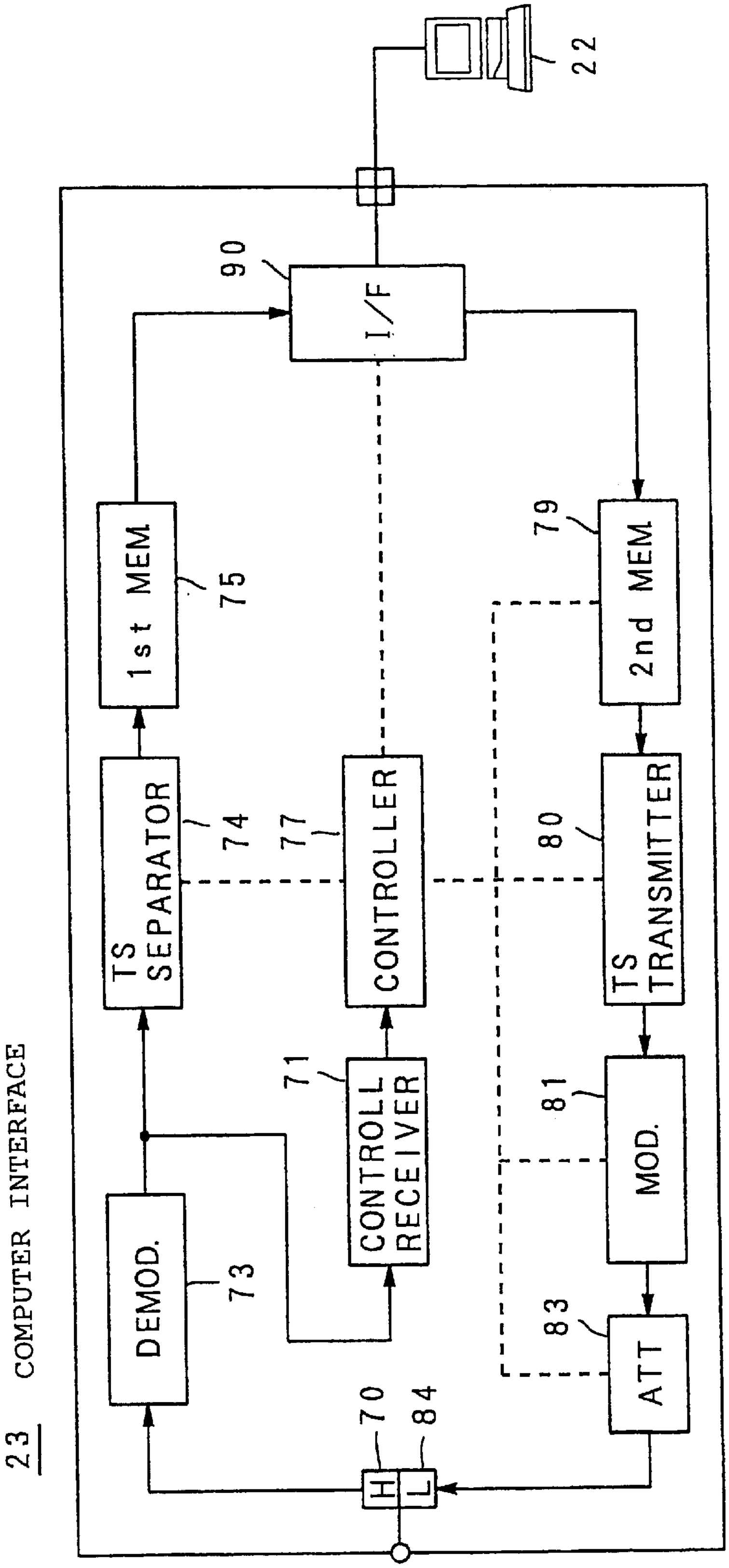
FIG. 4 is a block diagram illustrating the detailed configuration of the computer interface unit shown in FIG. 1.

FIG. 4 shows the configuration of the computer interface 23 provided at the terminal device 3. First the downstream data transmission will be described. The signal received from the center device 2 is filtered by the filter 70 which passes the downstream band signal, and is then demodulated by the demodulator 73 to be a digital signal. Then, the digital signal is supplied to the control receiver 71 which extracts therefrom various necessary information described later in detail, and is also supplied to the timeslot separator 74 which extracts the downstream timeslots TSD. The control receiver 71 monitors the upstream timeslot occupancy information 114 to obtain vacancy information indicating the vacant state therefrom. Then, the control receiver 71 gives vacancy information thus obtained to the controller 77.

Further, the control receiver 71 detects the downstream timeslot TSD addressed to itself by referring to call information 112 included, and gives it to the controller 77. Downstream data 115 included in the downstream timeslot addressed to the terminal device 3 is extracted from the received signal by the timeslot separator 74 under the control by the controller 77, and then sent to the computer 22 via the interface 90 after being stored in the first memory 75 and temporarily retained therein.

Next, the upstream data transmission will be described. Data sent from the computer 22 is supplied, via the interface 90, to the second memory 79 which temporarily stores it, and then the controller 77 waits for the appropriate timing at which stored data is to be outputted. The controller 77 watches vacancy information of the upstream timeslot from the control receiver 71, and when the vacant timeslot is found and the output timing arrives, the controller 77 instructs the timeslot transmitter 80 to read out data from the second memory 79 at the timing of the upstream time slot TSU corresponding to the down stream timeslot TSD in which vacancy information is detected. The time slot transmitter 80 produces timeslot data which includes data thus read out and other necessary data, and then sends the timeslot thus produced to the modulator 81. The modulator 81 modulates the timeslot using a carrier signal of a predetermined upstream band frequency, and subsequently the attenuator 83 adjusts the transmission level of the modulated carrier signal. The filter 84 passes the carrier signal in the upstream signal band to be sent out to the coaxial cable 34 as an upstream timeslot.

Thereafter, the controller 77 again receives, at the subsequent cycle, the downstream timeslot TSD in which vacancy information of the upstream timeslot has been detected, and checks collision information 118 detected by the control receiver 71. If it is detected that the collision has taken place, the controller 77 tries to find a vacant upstream timeslot TSU once again. On the other hand, if the no collision has taken place, the controller 77 instructs the timeslot transmitter 80 to read out and output data remaining in the second memory 79 at the same timing of the upstream timeslot TSU, and additionally starts looking for another vacant upstream timeslot TSU. The controller 77 cyclically instructs the timeslot transmitter 80 to output data remaining in the second memory 79 at the timings of the same upstream timeslot TSU, until there becomes no data remaining therein. When all data has read out and sent out to the center device 2, the controller 77 stops issuing the instruction, and thus the transmission of the upstream timeslots is terminated. In the non-transmitting status, i.e., after the termination of the transmission, there is no carrier signal included in the signal transmitted to the center device 2. When new data to be transmitted is written into the second memory 79 from computer 22, the controller 77 begins to detect vacant upstream timeslot TSU in the same manner.

Figure 6:
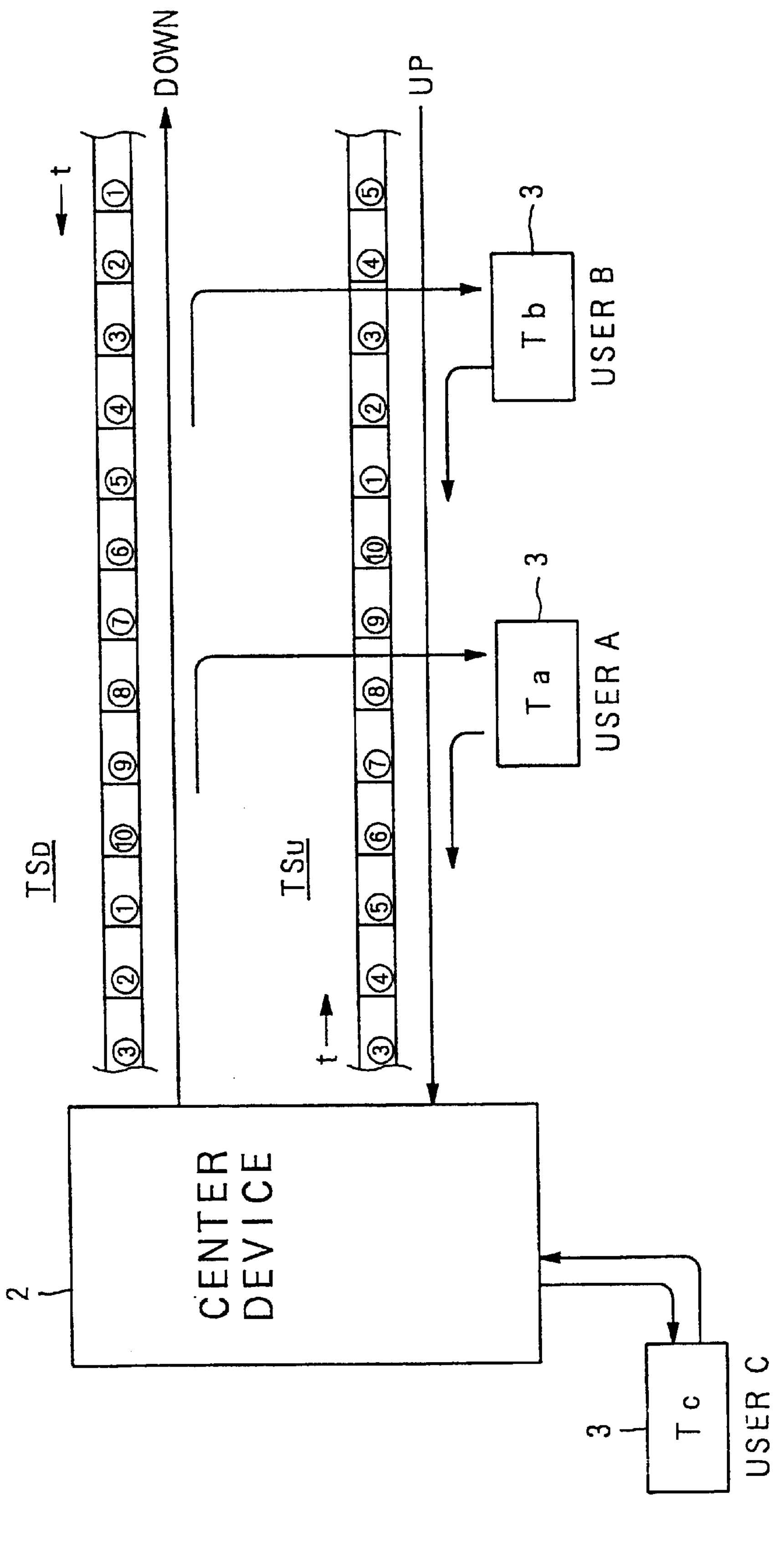
FIG. 6 is an explanatory diagram illustrating the communication manner between the center device and the terminal devices according to the present invention.
Figure 7:
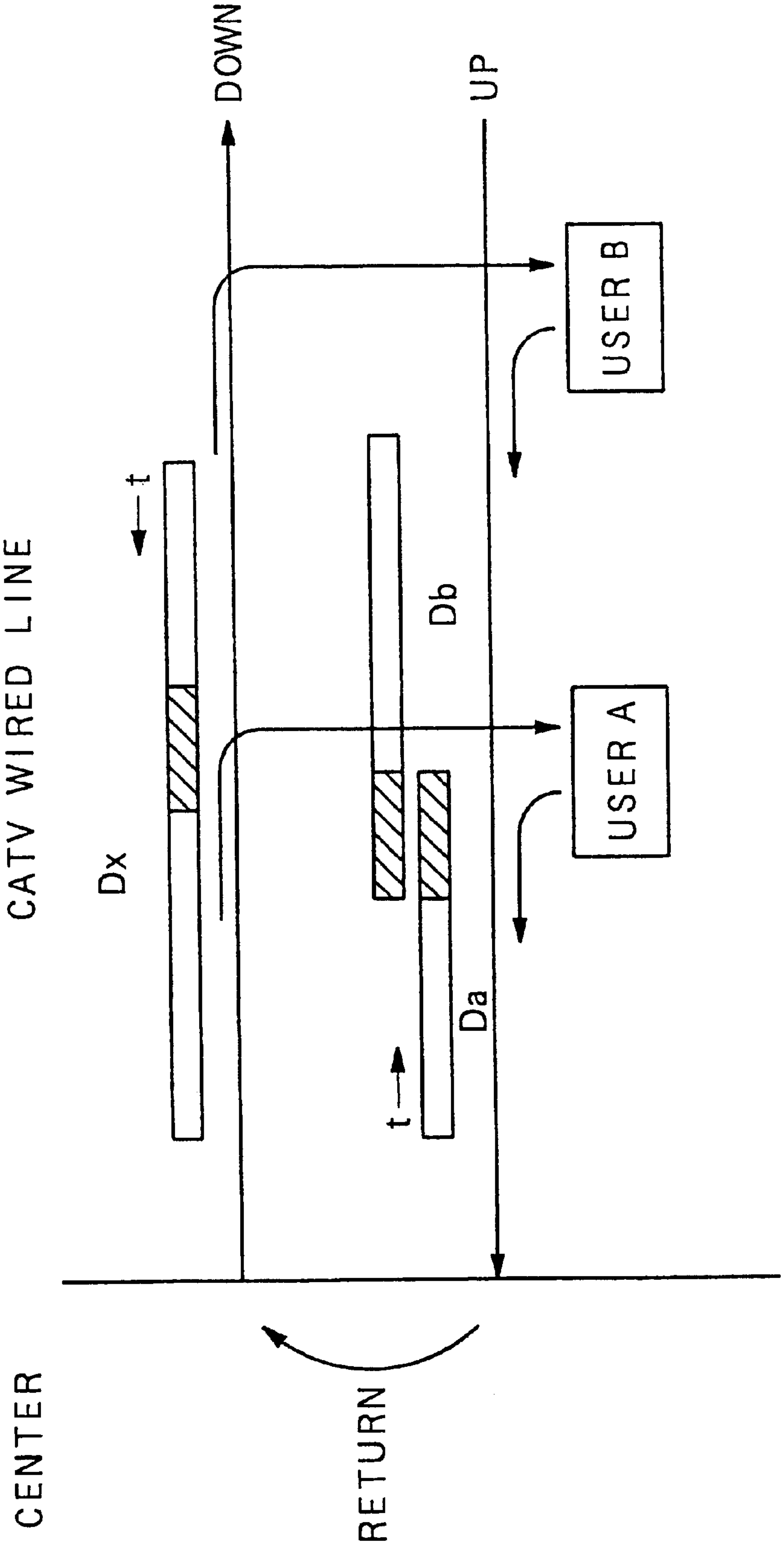
FIG. 7 is an explanatory diagram illustrating the performance by the packet communication system with collision detection function.
Figure 8:
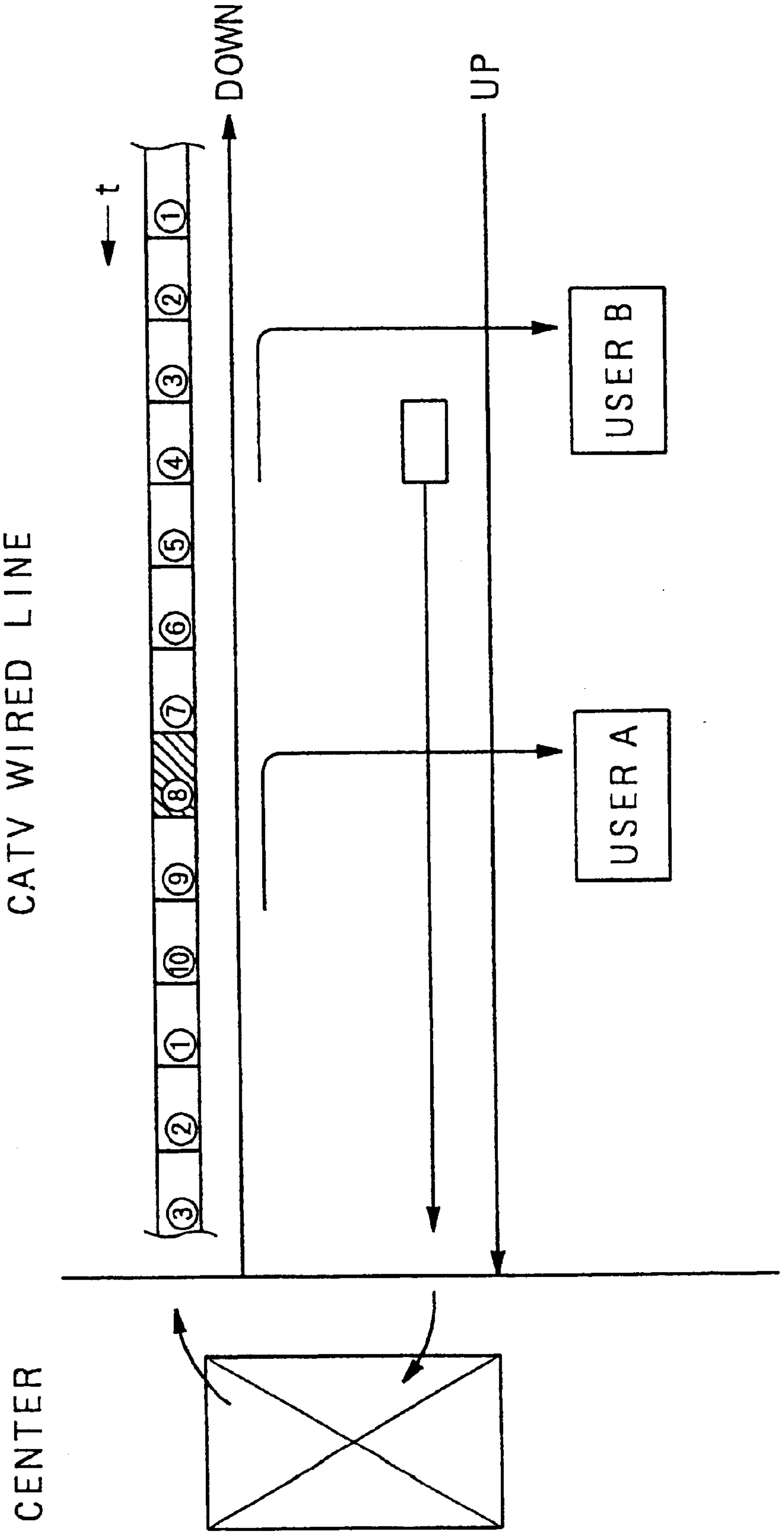
FIG. 8 is an explanatory diagram illustrating the performance by the timeslot communication system.

Next, data communication according to the present invention will be described in more detail below with reference to FIGS. 5A, 5B and 6. In this case, it is assumed for the sake of brevity that time-division multiplex transmission using ten timeslots is performed in both the upstream communication (from the terminal device 3 to the center device 2) and the down stream communication (from the center device 2 to the terminal device 3). Namely, ten timeslots, first to tenth shown in FIG. 6, are cyclically transmitted in both the upstream transmission line and the downstream transmission line. In FIG. 6, the arrow t represents the time axis (timeslot transmission order). The timeslot flowing in the upstream transmission line has the data structure shown in FIG. 5A, and the timeslot flowing in the downstream transmission line has the data structure shown in FIG. 5B. Data to be transmitted is included as data 105 in the upstream timeslot TSU, and is included as data 115 in the downstream timeslot TSD. Although the upstream and the down stream lines are further multiplexed into plural frequencies by frequency-multiplexing in practice, the following description is directed to the operation in one frequency band for the sake of brevity.

First, the operation in the normal data communication will be described. Now, it is assumed that the seventh timeslot and the eighth timeslot shown in FIG. 6 are vacant (i.e., not used) in the upstream communication. In this case, upstream timeslot occupancy information 114 in the seventh and the eighth downstream timeslots TSD flowing in the downstream line take value "0", indicating the vacancy. The downstream timeslots TSD other than the seventh and the eighth downstream timeslots are flowing in the downstream line with upstream timeslot occupancy information 114 being the terminal ID indicative of the sender terminal device 3 and data 115 being directed to the terminal device 3 specified by call information 112. When a user A instructs to the computer 22 to start communication with the other user by using the CATV wired line 4, the terminal device Ta checks the contents of downstream timeslots TSD flowing in the downstream line one after another, and finds out that the seventh and the eighth upstream timeslots TSU are now vacant because upstream timeslot occupancy information 114 of them take value "0". This system is so designed that the upstream timeslot TSU and the downstream timeslot TSD of the same number (first, second, . . . ) pass the identical terminal device 3 at the same time. Namely, when the terminal device Ta watches the downstream timeslots TSD flowing and detects the seventh downstream timeslot which upstream timeslot occupancy information 114 being "0", the upstream timeslot TSD which is passing the terminal device Ta is defined as the seventh upstream timeslot TSU. In practice, the timing of the timeslot transmission is designed in consideration of the possible delay so that the terminal device 3 located furthest from the center device 2 can maintain the correct timing relationship as described above. The terminal device Ta sends data 105 to the center device 2 by the seventh upstream timeslot, which includes ID information 104 indicating the terminal device Ta itself.

When receiving the upstream timeslot TSU from the terminal device Ta, the center device 2 determines to assign the seventh upstream timeslot to the terminal device Ta thereafter, and sets the upstream timeslot occupancy information 114 of the seventh downstream timeslot TSD to be the terminal ID specifying the terminal device Ta from next cycle. The terminal device Ta then detects this timeslot in the downstream line, and recognize that the seventh timeslot has been assigned. The terminal device Ta also checks whether or not collision information indicates the collision occurrence. If the collision has not took place, the terminal device Ta communicates with other users by the seventh timeslot thus obtained, using the next seventh timeslot, i.e., at the timing one frame interval later. The operation in the occurrence of the collision will be described later in detail.

After obtaining the seventh timeslot in this way, the terminal device Ta tries to get another timeslot for its communication, i.e., the eighth timeslot in this example, while continuing the communication by using the seventh timeslot. This trial is performed in the same way as described above. Namely, in the same manner as the seventh timeslot is obtained, the terminal device Ta gets the eighth timeslot for its exclusive use. After then, the terminal device Ta further tries to get another timeslot for its use. In this way, the terminal device 3 continues the trial to increase the usable timeslot until it obtains all vacant timeslots. By thus designing the system, the terminal device 3 can use as many timeslots as possible when the CATV line 4, and hence the substantial communication rate can be remarkably improved when the transmission line is uncrowded. On the contrary, if it is unfavorable that all usable timeslots are occupied only a few terminal devices by designing the system as described above, the system may be so designed that a single terminal device 3 is permitted to use only a limited number of timeslots (e.g., 2, 3, . . . ) at the same time.

Next, the operation after the collision will be described below. It is now assumed that the ninth upstream timeslot TSU is vacant, and that users A and B wish to use the CATV communication line 4. The two users A and B refer to the upstream timeslot vacancy information 114 with respect to the ninth upstream timeslot, which is described in the nin th downstream timeslot TSD, find out the vacancy of the ninth upstream timeslot TSU, and then transmit data 105 almost simultaneously to the center device 2 by using the ninth upstream timeslot TSU. However, these data make a collision and are consequently broken. The center device 2 detects the breaking of data by making the CRC check or the like. The degree of data breaking depends upon how seriously data collide with each other. For example, if data is only partially broken, the center device 2 receives and demodulates broken data and makes the CRC check using the transmitted CRC data 106 to find out the data breaking. On the other hand, the center device 2 usually keeps on checking the level of the carrier signal, and when the center device 2 detects that the carrier signal is present but data is broken too seriously for the center device 2 to demodulate it, the center device 2 recognizes the data collision by the carrier presence and the impossibility of demodulating it. In both cases, the center device 2 determines that the data collision has occurred, sets collision information 118 of the ninth downstream timeslot TSD to the value "1"indicative of the data collision occurrence, and makes the ninth downstream timeslot TSD flow in the downstream line at the timing one frame interval later from the downstream timeslot in which the vacancy is detected. The terminal devices Ta and Tb refer to collision information 118 in the ninth downstream timeslot of next cycle, and knows that the collision has occurred. Then, the terminal devices Ta and Tb again try to send data, respectively, after a predetermined time interval (e.g., random time period). In the above case, while the center device 2 sends the ninth downstream timeslot including collision information 118, the center device 2 uses the other data area, i.e., data 115, for the data transmission to other user. Namely, the center device 2 includes necessary data as data 115 and sets the ID of the terminal device 3 to which data is directed to call information 112, and then sends the ninth downstream timeslot. In this case, data 115 may be directed to a predetermined or all terminal devices (e.g., directed from the terminal device 3 located outside of the center device 2 to the terminal device 3 located under the center device 2) but other than the terminal devices Ta and Tb.

As described above, in the present invention, the center device detects the data collision and announces the terminal devices the collision by setting collision information 118 in the downstream timeslot TSD. Therefore, the center device 2 does not simply return data broken by the collision to be flown in the downstream transmission line unlike the conventional system, data of no more than one upstream timeslot is lost by the collision, thereby diminishing data loss by the collision. In addition, since collision information is only a small part of the downstream timeslot TSD and other part of the timeslot can be used for transmitting data to other terminal devices 3, the transmission efficiency can be remarkably improved.

Next, the description will be given of the operation at the time when data supply by the terminal device 3 is temporarily stopped. As described above, transmission data outputted from the computer 22 is temporarily stored in the second memory 79 within the computer interface unit 23 by a predetermined data quantity, and then outputted to the upstream transmission line by the units each having the data capacity no more than the capacity of a single timeslot (i.e., quantity of data 115). Therefore, if the data supply from the computer 22 is stopped, the second memory 79 becomes empty, and as a result even the carrier signal is not outputted to the upstream transmission line. For example, assuming now that the transmission data supplied from the user A, using the third time slot, is stopped, the third upstream timeslot TSU does not include even the carrier signal. This situation may take place in the case when the user is examining data received from the companion, preparing response data to be returned to the sender, receiving data transmitted from the sender, or receiving and watching video data, such as a TV program, supplied from the center device 2. In other words, this situation may take place unless the computer 22 keeps on outputting some kind of data continuously. However, while data is not actually transmitted, the transmission line maintained still connected to the center device 2. In addition, only the upstream timeslot TSU contains no data and the downstream timeslot TSD may contain data from other sender. In such a situation, the center device 2 finds out the absence of data in the third upstream timeslot by detecting the absence of the carrier signal, and sets upstream timeslot occupancy information 114 with respect to the third upstream timeslot TSU, included in the third downstream timeslot TSD, to be "0", so that other user can temporarily use the third timeslot. By this, the user B who wishes to use the transmission line can use the third timeslot thus made usable. In this way, the user B can make a connection with a terminal device C connected to the network outside of the center device 2 or with the service center such as an Internet service provider. When the communication by the user B ends, the terminal device A is allowed to restart the communication by using the third timeslot. In this way, if no data is being transmitted while the transmission line is kept connected, the center device 2 permits other user to use the timeslot temporarily. Therefore, even the short break of the data transmission can be used by the transmission by the other user, and thereby the efficiency in using the transmission line may be improved.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which comes within the meaning and range of equivalency of the claims are therefore intended to be embraced therein.

What is claimed is:

1. A communication method between a center device and a plurality of terminal devices connected by a network, said method comprising the steps of:

(a) transmitting, from said center device to said terminal devices, cyclically a group of downstream timeslots each of which is distinctive from each other, each downstream timeslot being a first unit of data communication and each of said downstream timeslots including upstream timeslot occupancy information indicating the vacancy of an upstream timeslot corresponding to the downstream timeslot if the upstream timeslot is vacant, assignment information of the upstream timeslot indicating the one of the plurality of terminals which is being assigned to the upstream timeslot when the upstream timeslot is occupied, and downstream data, said transmitting step (a) transmitting the upstream timeslot occupancy information regardless of whether the upstream timeslot is vacant or occupied;

(b) checking, at the terminal device, the upstream timeslot occupancy information in the downstream timeslots to detect a downstream timeslot including the upstream timeslot occupancy information of a vacant state;

(c) sending timeslot use request, from said terminal device to said center device, by an upstream timeslot specified by the upstream timeslot occupancy information of the vacant state at a timing corresponding to the downstream timeslot detected in the step (b), each upstream timeslot being a second unit of data communication;

(d) receiving, at said center device, the upstream timeslot sent in the step (c), and sending a downstream timeslot, to the terminal devices, which includes the assignment information indicating that the timeslot is assigned to the terminal device which has sent the timeslot use request and the upstream timeslot occupancy information of the occupied state;

(e) detecting, at said terminal device, the assignment information in the downstream timeslots and, if the assignment information indicating the assignment of the upstream timeslot to the terminal device, sending upstream data using the upstream timeslot assigned to the terminal device, wherein the address of the downstream data included in the downstream timeslot is irrelevant to the address of the terminal devices.

2. A method according to claim 1, further comprising the steps of:

sending collision information from the center device to the terminal devices if the center device detects a collision of the upstream timeslots, and sending, from the terminal device to the center device, the upstream timeslot including the timeslot use request once again if the terminal device detects the collision information in the downstream timeslot corresponding to the upstream timeslot in which the previous timeslot use request is included.

3. A method according to claim 2, further comprising the steps of:

setting, at the center device, the upstream timeslot occupancy information of a downstream timeslot to the occupied state if a carrier signal to be modulated by the upstream data is detected and no collision is detected in the upstream timeslot corresponding to the downstream timeslot; and setting, at the center device, the upstream timeslot occupancy information of a downstream timeslot to the vacant state if a carrier signal to be modulated by the upstream data is not detected at the upstream timeslot corresponding to the downstream timeslot.

4. A method according to claim 1, wherein the upstream timeslot occupancy information comprises the assignment information and is indicated by the assignment information.

5. A method according to claim 1, further comprising the steps of detecting, at said center device, a carrier signal to be modulated by the upstream data in the upstream timeslots, and setting the upstream timeslot occupancy information of the downstream timeslot, corresponding to the upstream timeslot which includes no carrier signal, to the vacant state.

6. A method according to claim 5, further comprising the step of changing the upstream timeslot occupancy information to the vacant state if the carrier signal is not detected from an identical upstream timeslot for a predetermined time period.

7. A method according to claim 1, further comprising the step of repeating the steps (b) to (e) until a predetermined number of upstream timeslots are assigned.

8. A method according to claim 1, wherein said center device assigns the upstream timeslots according to a predetermined priority order of the terminal devices.

9. A method according to claim 1, further comprising the step of repeating the steps (b) to (e) until the upstream timeslot occupancy information of the vacant state is no longer detected.

10. A communication system comprising a center device and a plurality of terminal devices connected by a network, said center device comprising:

a downstream timeslot transmitter for sending, to said terminal devices, cyclically a group of downstream timeslots, each downstream timeslot being a first unit of data communication, and each of which downstream timeslot is distinctive from each other, each of said downstream timeslot including upstream timeslot occupancy information indicating the vacancy of an upstream timeslot, each upstream timeslot being a second unit of data communication, and corresponding to the downstream timeslot if the upstream timeslot is vacant, assignment information of the upstream timeslot indicating the one of the plurality of terminals which is being assigned to the upstream timeslot when the upstream timeslot is occupied, and downstream data, said downstream timeslot transmitter sending the upstream timeslot occupancy information regardless of whether the upstream timeslot is vacant or occupied, wherein the downstream data included in the downstream timeslot is irrelevant to upstream data sent from the terminal devices; and a transceiver for receiving the upstream timeslots from the terminal device and for sending a downstream timeslot, to the terminal devices, which includes the assignment information indicating that the timeslot is assigned to the terminal device which has sent the timeslot use request and the upstream timeslot occupancy information of the occupied state, and each of said terminal devices comprising:

a checking device for checking the upstream timeslot occupancy information in the downstream timeslots to detect a downstream timeslot including the upstream timeslot occupancy information of a vacant state;

a transmitter means for sending timeslot use request to said center device, by an upstream timeslot specified by the upstream timeslot occupancy information of the vacant state; and a detector for detecting the assignment information in the downstream timeslots and, if the assignment information indicates the assignment of the upstream timeslot to the terminal device, sending the upstream data using the upstream timeslot assigned to the terminal device.

11. A system according to claim 10, wherein said center device further comprises a device for sending collision information to the terminal devices if the center device detects a collision of the upstream timeslots, and wherein each of said terminal devices comprises a device for sending, to the center device, the upstream timeslot including the timeslot use request once again if the terminal device detects the collision information in the downstream timeslot corresponding to the upstream timeslot in which the previous timeslot use request is included.

12. A system according to claim 10, wherein said center device assigns the upstream timeslots according to a predetermined priority order of the terminal devices.

13. A system according to claim 10, wherein the upstream timeslot occupancy information comprises the assignment information and is indicated by the assignment information.

14. A system according to claim 10, wherein said center device further comprises a detector for detecting a carrier signal to be modulated by the upstream data in the upstream timeslots, and for setting the upstream timeslot occupancy information of the downstream timeslot, corresponding to the upstream timeslot which includes no carrier signal, to the vacant state.

15. A center device of a communication system connected to a plurality of terminal devices by a network, said center device comprising:

a downstream timeslot transmitter for sending, to said terminal devices, cyclically a group of downstream timeslots, each downstream timeslot being a first unit of data communication, and each of which is distinctive from each other, each of said downstream timeslot including upstream timeslot occupancy information indicating the vacancy of an upstream timeslot, each upstream timeslot being a second unit of data communication, and corresponding to the downstream timeslot if the upstream timeslot is vacant, assignment information of the upstream timeslot indicating the one of the plurality of terminals which is being assigned to the upstream timeslot when the upstream timeslot is occupied, and downstream data, said downstream timeslot transmitter sending the upstream timeslot occupancy information regardless of whether the upstream timeslot is vacant or occupied, wherein the downstream data included in the downstream timeslot is irrelevant to upstream data sent from the terminal devices; and a transceiver for receiving the upstream timeslots from the terminal device and for sending a downstream timeslot, to the terminal devices, which includes the assignment information indicating that the timeslot is assigned to the terminal device which has sent the timeslot use request and the upstream timeslot occupancy information of the occupied state.

16. A terminal device of a communication system connected, by a network, to a center device which cyclically sends, to said terminal device, a group of downstream timeslots, each downstream timeslot being a first unit of data communication, and each of which is distinctive from each other, each of said downstream timeslot including upstream timeslot occupancy information indicating the vacancy of an upstream timeslot, each upstream timeslot being a second unit of data communication, and corresponding to the downstream timeslot if the upstream timeslot is vacant, assignment information of the upstream timeslot indicating the one of the plurality of terminals which is being assigned to the upstream timeslot when the upstream timeslot is occupied, and downstream data, said center device sending the upstream timeslot occupancy information regardless of whether the upstream timeslot is vacant or occupied, said terminal device comprising:

a checking device for checking the upstream timeslot occupancy information in the downstream timeslots to detect a downstream timeslot including the upstream timeslot occupancy information of a vacant state;

a transmitter for sending timeslot use request, to said center device, by an upstream timeslot specified by the upstream timeslot occupancy information of the vacant state; and a detector for detecting the assignment information in the downstream timeslots and, if the assignment information indicates the assignment of the upstream timeslot to the terminal device, sending the upstream data using the upstream timeslot assigned to the terminal device, wherein the address of the downstream data included in the downstream timeslot is irrelevant to the address of the terminal device.

* * * * *